United States Patent
Luo

(12) United States Patent (10) Patent No.: US 7,400,352 B1
Luo (45) Date of Patent: Jul. 15, 2008

(54) METHOD OF ESTIMATING ELECTRICAL CROSS TALK IN AN ARRAY OF IMAGING CELLS

(75) Inventor: Qiang Luo, Santa Clara, CA (US)

(73) Assignee: Eastman Kodak Company, Rochester, NY (US)

( * ) Notice: Subject to any disclaimer, the term of this patent is extended or adjusted under 35 U.S.C. 154(b) by 770 days.

(21) Appl. No.: 10/854,056

(22) Filed: May 26, 2004

(51) Int. Cl.
*H04N 17/00* (2006.01)
(52) U.S. Cl. ........................ 348/241; 386/115
(58) Field of Classification Search ............... 348/180, 348/187–188, 241; 382/254; 386/22, 115, 386/114
See application file for complete search history.

(56) References Cited

U.S. PATENT DOCUMENTS

| | | | | |
|---|---|---|---|---|
| 5,053,615 | A * | 10/1991 | Patel | 250/208.1 |
| 5,673,336 | A * | 9/1997 | Edgar et al. | 382/167 |
| 5,818,572 | A * | 10/1998 | Pappas et al. | 356/124.5 |
| 6,529,239 | B1 * | 3/2003 | Dyck et al. | 348/279 |
| 6,791,716 | B1 * | 9/2004 | Buhr et al. | 358/1.9 |
| 6,965,692 | B1 * | 11/2005 | Ford | 382/167 |
| 6,982,756 | B2 * | 1/2006 | Nakamura | 348/241 |
| 7,053,458 | B2 * | 5/2006 | Mann et al. | 257/452 |
| 7,102,669 | B2 * | 9/2006 | Skow | 348/222.1 |
| 7,170,555 | B1 * | 1/2007 | McCleary | 348/241 |
| 7,215,361 | B2 * | 5/2007 | Duesman et al. | 348/187 |
| 7,248,288 | B2 * | 7/2007 | Ikeda et al. | 348/222.1 |
| 2002/0060742 | A1 * | 5/2002 | Takubo | 348/241 |
| 2003/0030729 | A1 * | 2/2003 | Prentice et al. | 348/220.1 |
| 2004/0161165 | A1 * | 8/2004 | Riley et al. | 382/294 |

OTHER PUBLICATIONS

U.S. Appl. No. 10/688,657, filed Oct. 17, 2003, Luo.
Igor Shcherback and Orly Yadid-Pecht, "CMOS APS MTF Modeling", IEEE Transactions on Electron Devices, vol. 48, No. 12, Dec. 2001, pp. 2710-2715.
J.S. Lee et al., "Empirical Characterization of Lateral Crosstalk for CMOS Image Sensors and Deblurring Operations", IEEE Workshop on Charge-Coupled Devices and Advanced Image Sensors, Schloss Elmau, Elmau, Germany, 2003, pp. 1-6.
Gennadiy Agranov et al., "Crosstalk and Microlens Study in a Color CMOS Imager Sensor", IEEE Transactions on Electron Devices, vol. 50, No. 1, Jan. 2003, pp. 4-11.
Eric G. Stevens, "A Unified Model of Carrier Diffusion and Sampling Aperature Effects on MTF in Solid-State Image Sensors", IEEE Transactions on Electron Devices, vol. 39, No. 11, Nov. 1992, pp. 2621-2623.
O. Yadid-Pecht, "The Geometrical Modulation Transfer Function (MTF) For Different Pixel Active Area Shapes", Optical Engineering, vol. 39, No. 4, 2000, pp. 859-865, (see attached pp. 1-25).
C. Marques and P. Magnan, "Experimental Characterization and Simulation of Quantum Efficiency and Optical Cross Talk of CMOS Photodiode APS" Proceedings of SPIE, vol. 4669, Sensors and Camera Systems for Scientific, Industrial, and Digital Photography Applications III, Jan. 21-23, 2002, San Jose, CA, pp. 107-116.

* cited by examiner

*Primary Examiner*—David Ometz
*Assistant Examiner*—Pritham D. Prabhakher
(74) *Attorney, Agent, or Firm*—Nancy R. Simon

(57) ABSTRACT

The electrical cross talk in color solid-state image sensor is estimated or characterized by acquiring image data from an array of imaging cells which is a portion of a much larger array, extracting cross talk data from the acquired image data, and characterizing the cross talk based on the extracted coefficients.

17 Claims, 9 Drawing Sheets

METHOD OF ESTIMATING ELECTRICAL CROSS TALK IN AN ARRAY OF IMAGING CELLS

BACKGROUND OF THE INVENTION

1. Field of the Invention

The present invention relates to imaging cells and, more particularly, to a method of estimating electrical cross talk in an array of imaging cells.

2. Description of the Related Art

A color solid-state image sensor has a large number of imaging cells that are arranged in rows and columns, and a color filter that lies over the imaging cells. When exposed to light, the photons which pass through the color filter are absorbed by the imaging cells which, in turn, generate electron-hole pairs. Some of the photogenerated electrons can diffuse laterally a few cells, usually not more than two, before being collected by an adjacent imaging cell.

This lateral diffusion of electrons, known as electrical cross talk, causes color-shifting problems among image cells (pixels) in color solid-state image sensors. As a result, the captured view of monochromatic light shifts from its true color due to the addition of other color components.

In addition, the problem of electrical crosstalk becomes worse as the pitch between imaging cells shrinks (e.g., less than 5 um). The magnitude of the cross talk is a function of the doping profile, the charge free running distance, and the layout structure. For small pixels (e.g. 3.2 um pitch pixel with 0.18 um advanced CMOS processing), cross talk of red light can be as high as 20%, which causes a very bad color shifting problem that results in failed products.

A number of studies have been reported utilizing a laser-scanning technique to characterize a modulation transfer function (MTF) that is related to cross talk in CMOS image sensors. (See O. Yadid-Pecht, "The Geometrical Modulation Transfer Function (MTF) for Different Pixel Active Area Shapes", Optical Engineering, Vol. 39, No. 4, 2000, pp. 859-865; I. Shcherback and O. Yadid-Pecht, "CMOS APS MTF Modeling", IEEE Trans. On Electron Devices, Vol. 48, No. 12, 2001, pp. 2710-2715; and C. Marques and P. Magnan, "Experimental Characterization and Simulation of Quantum Efficiency and Optical Cross Talk of CMOS photodiode APS", Electronic Imaging 2002, Conf. 4669A—Sensors, Cameras and Systems for Scientific/Industrial Applications IV, San Jose, Calif. 2002).

Further, cross talk and its effect on solid-state sensors and deblurring operations by employing convolution theorem are described in J. S. Lee, J. Shah, M. Ed Jernigan and R. I. Hornsey, "Empirical Characterization of Lateral Cross Talk for CMOS Image Sensors and Deblurring Operations", IEEE Workshop on Charge-Coupled Devices and Advanced Image Sensors, Schloss Elmau, Elmau, Germany, 2003 and E. Stevens, "A Unified Model of Carrier Diffusion and Sampling Aperture Effects on MTF in Solid-State Image Sensors", IEEE Trans. On Electron Devices, Vol. 39, No. 11, 1992, pp. 2621-2623. Micron lens study on reducing cross talk is discussed by G. Agranov, V. Berezin and R. Tsai, "Cross talk and Microlens Study in a Color CMOS Image Sensor", IEEE Trans. On Electron Devices, Vol. 50, No. 1, 2003, pp. 4-11. All the studies are focused on either MTF or methods of reducing cross talk.

There has not been an efficient way to estimate electrical cross talk in the industry such that sources of cross talk and the amount of cross talk in different directions can be quantified and the performance of an array of imaging cells can be predicted from monochrome image sensor results. Thus, there is a need for a method of estimating cross talk in an array of imaging cells to predict the performance of the array of imaging cells.

DETAILED DESCRIPTION OF THE INVENTION

Figure 1:
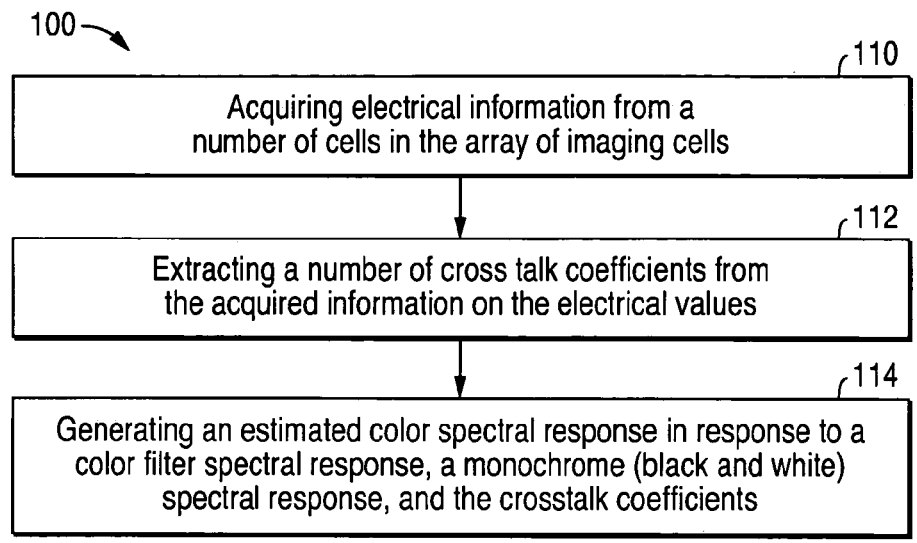
FIG. 1 is a flow chart illustrating an example of a method 100 of estimating electrical cross talk in an array of imaging cells in accordance with the present invention.

FIG. 1 shows a flow chart that illustrates an example of a method 100 of estimating electrical cross talk in an array of imaging cells in accordance with the present invention. As shown in FIG. 1, method 100 begins at step 110 by acquiring electrical information from a number of cells in the array of imaging cells.

Figure 2:
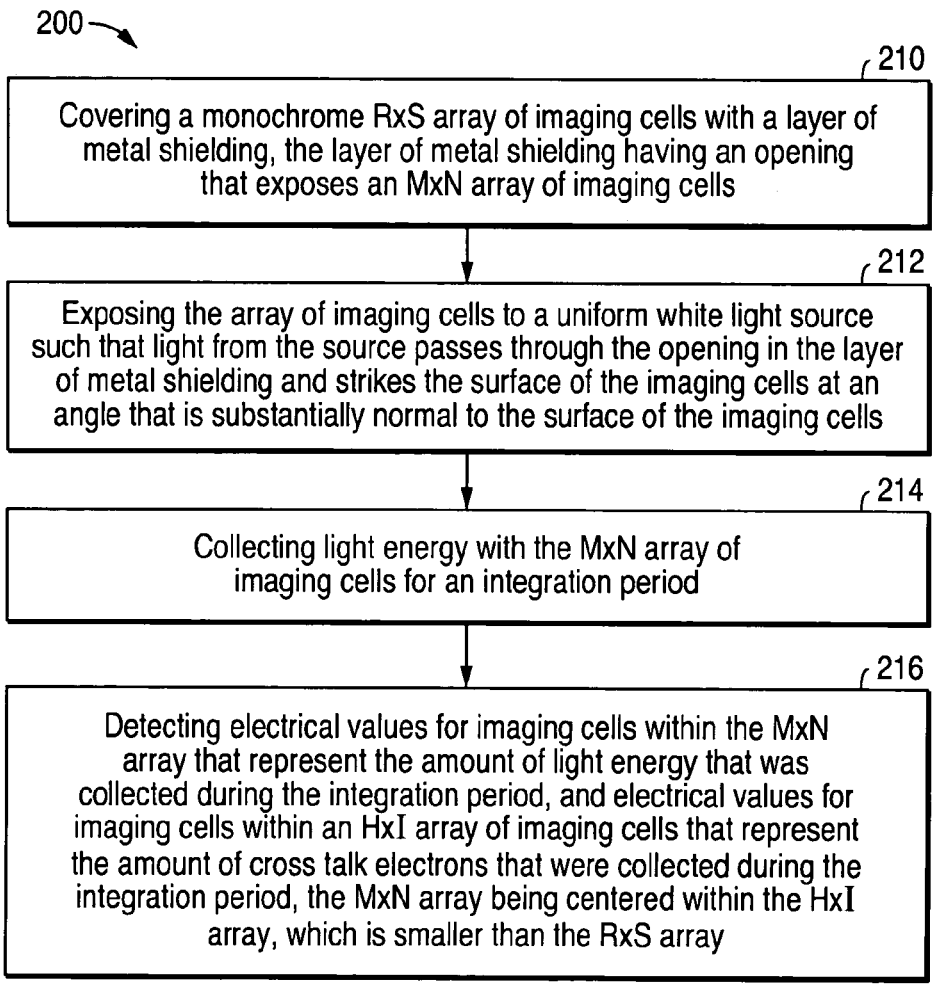
FIG. 2 is a flow chart illustrating an example of a method 200 of acquiring electrical information from the imaging cells in accordance with the present invention.

FIG. 2 shows a flow chart that illustrates an example of a method 200 of acquiring electrical information from the imaging cells in accordance with the present invention. As shown in FIG. 2, method 200 begins at step 210 by covering a monochrome R×S array of imaging cells (that does not have overlying color filters) with a layer of metal shielding. In addition, the layer of metal shielding has an opening that exposes an M×N array of imaging cells (for example, 16×16 cells). In addition, the edges of the opening exactly cover the edges of the imaging cells.

Following this, method 200 moves from step 210 to step 212 where the monochrome pixel array is exposed to a uniform white light source such that light from the source passes through the opening in the layer of metal shielding and strikes the surface of the imaging cells at an angle that is substantially normal to the surface of the imaging cells.

Figure 3:
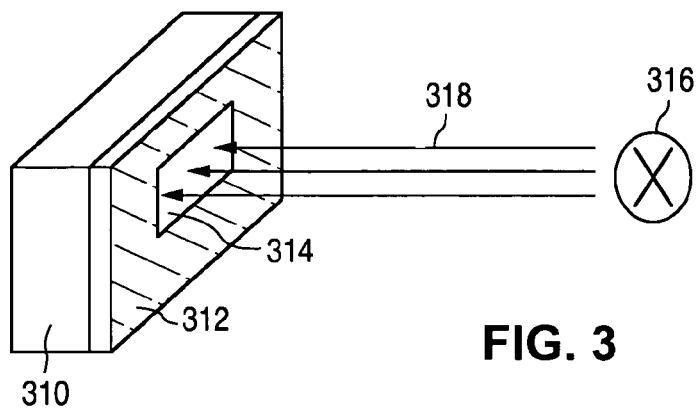
FIG. 3 is a diagram illustrating an example of steps 210 and 212 in accordance with the present invention.

FIG. 3 shows a diagram that illustrates an example of steps 210 and 212 in accordance with the present invention. As shown in FIG. 3, an R×S array 310 of imaging cells is covered by a metal shielding layer 312 which has an opening 314 that exposes an M×N array of imaging cells. In addition, as further shown in FIG. 3, the M×N array of imaging cells is exposed to a uniform white light source 316 that emits a beam of light 318 which strikes the surfaces of the exposed imaging cells at an angle that is substantially normal to the surfaces of the exposed imaging cells.

Returning to FIG. 2, after being exposed to the white light source, method 200 moves from step 212 to step 214 to collect light energy with the M×N array of imaging cells for an integration period, and then to step 216 to detect electrical values for imaging cells within the M×N array that represent the amount of light energy that was collected during the integration period.

In addition, in step 216, method 200 also detects electrical values for imaging cells within an H×I array of imaging cells that represent the amount of cross talk electrons that were collected during the integration period. The M×N array is centered within the H×I array, which is smaller than the R×S array. As a result, electrical values are detected for cells which surround the M×N array and receive cross talk electrons, but which were not exposed to light.

Figure 4:
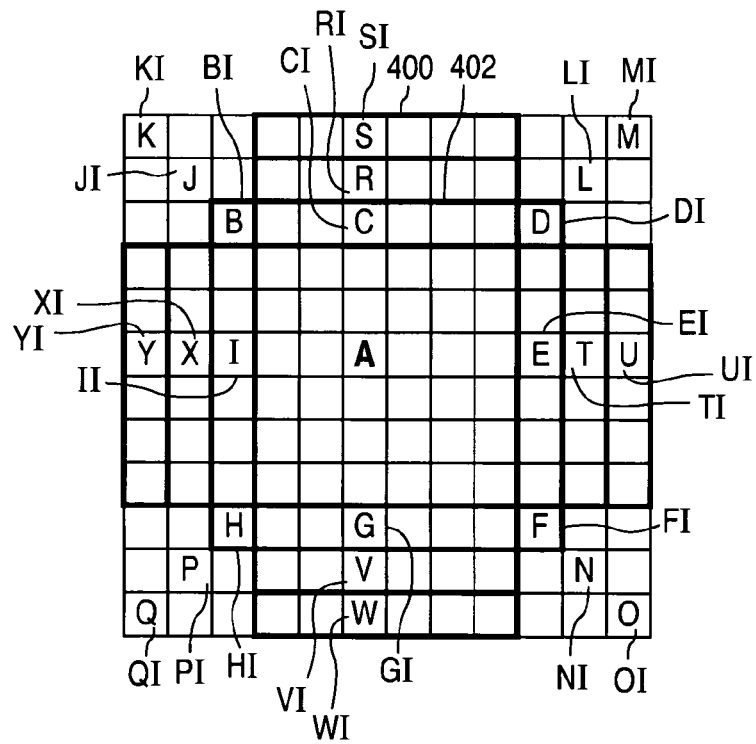
FIG. 4 is a diagram illustrating an example of an H×I array 400 of imaging cells in accordance with the present invention.

FIG. 4 shows a diagram that illustrates an example of an H×I array 400 of imaging cells in accordance with the present invention. As shown in FIG. 4, H×I array 400 includes an M×N array 402 that is centered within H×I array 400, and divided into Z regions. In the FIG. 4 example, H×I array 400 is implemented with a 12×12 array, and M×N array 402 is implemented with an 8×8 array, which is divided into nine regions.

The nine regions include a center region A that has an O×P array of imaging cells ((M−1)×(N−1)), four corner regions B, D, F, and H, and four intermediate regions C, E, G, and I. Each corner region B, D, F, and H has one imaging cell BI, DI, FI, and HI, respectively, that contacts center region A.

In addition, each intermediate region C, E, G, and I extends from one corner region B, D, F, and H to another corner region B, D, F, and H, and contacts center region A. Further, each intermediate region C, E, G, and I also has a number of cells that include imaging cells CI, EI, GI, and II, respectively.

H×I array 400 also includes regions J and K which each have one imaging cell JI and KI, respectively, that lie diagonally away from corner cell BI, and regions L and M which each have one imaging cell LI and MI that lie diagonally away from corner cell DI. H×I array 400 additionally includes regions N and O which each have one imaging cell NI and OI that lie diagonally away from corner cell FI, and regions P and Q which each have one imaging cell PI and QI that lie diagonally away from corner cell HI.

Further, H×I array 400 also includes a region R that adjoins region C, a region S that adjoins region R, a region T that adjoins region E, and a region U that adjoins region T. In addition, H×I array 400 includes a region V that adjoins region G, a region W that adjoins region V, a region X that adjoins region I, and a region Y that adjoins region X. Each region R, S, T, U, V, W, X, and Y has a number of cells that include imaging cells RI, SI, TI, UI, VI, WI, XI, and YI, respectively.

The imaging cells within M×N array 402 are exposed to light during an integration period. Following the integration period, the electrical values output by the imaging cells within M×N array 402 are detected. In addition, the electrical values output by the imaging cells in regions J-Y are also detected.

Referring again to FIG. 2, steps 214 and 216 can be repeated a number of times, such as 100 times, and an average of the electrical values can be determined to represent the electrical values from the cells in the array. By repeating steps 214 and 216 a number of times to obtain average values, the influence of temporal noise can be eliminated.

Returning to FIG. 1, after information on the electrical values from a number of cells in the H×I array of imaging cells has been acquired, method 100 moves from step 110 to step 112. In step 112, method 100 extracts a number of cross talk coefficients from the acquired information on the electrical values.

Figures 5, 6:
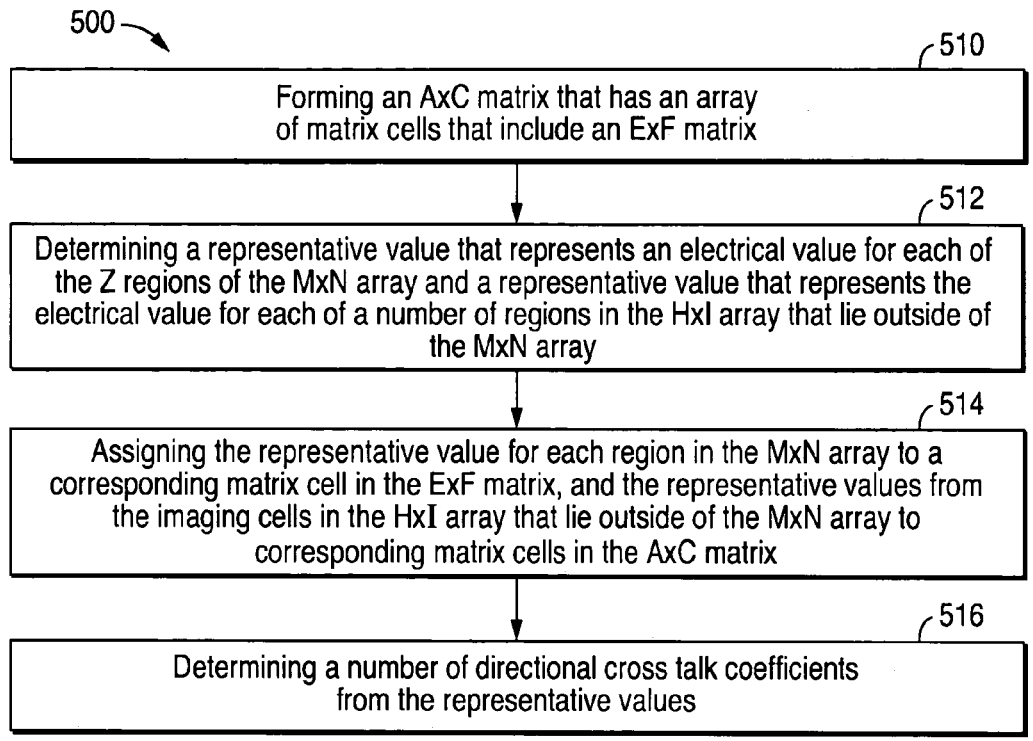
FIG. 5 is a flow chart illustrating an example of a method of extracting cross talk coefficients in accordance with the present invention.
FIG. 6 is a diagram illustrating an example of an A×C matrix 600 in accordance with the present invention.

FIG. 5 shows a flow chart that illustrates an example of a method of extracting cross talk coefficients in accordance with the present invention. As shown in FIG. 5, method 500 begins at step 510 by forming an A×C matrix that has an array of matrix cells that include an E×F matrix. The E×F matrix includes Z cells (E*F cells) that include a center cell, four corner cells, and four intermediate cells that lie between the four corner cells.

FIG. 6 shows a diagram that illustrates an example of an A×C matrix 600 in accordance with the present invention. As shown in FIG. 6, A×C matrix 600 includes an E×F matrix 602, centered within A×C matrix 600, that includes Z matrix cells. In the FIG. 6 example, A×C matrix 600 is implemented with a 7×7 matrix, while E×F matrix 602 is implemented with a 3×3 matrix that has nine matrix cells.

The nine matrix cells include a center cell A, four corner cells B, D, F, and H that contact center cell A, and four intermediate cells. C, E, G, and I that lie between the corner cells B, D, F, and H and contact center cell A. A×C matrix 600 also includes matrix cells I and K that lie diagonally away from corner cell B, matrix cells L and M that lie diagonally away from corner cell D, matrix cells N and O that lie diagonally away from corner cell F, and matrix cells P and Q that lie diagonally away from corner cell H. Further, A×C matrix 600 also includes matrix cells R and S that lie away from matrix cell C, matrix cells T and U that lie away from matrix cell E, matrix cells V and W that lie away from matrix cell G, and matrix cells X and Y that lie away from matrix cell I.

Returning to FIG. 5, after the A×C matrix has been formed, method 500 moves from step 510 to step 512 to determine a representative value that represents an electrical value for each of the Z regions of the M×N array, and a representative value that represents the electrical value for each of the regions in the H×I array (regions J-Y) that lie outside of the M×N array.

To suppress the effect of fixed pattern noise, the electrical values from the imaging cells in center region A (the inner (M−1)×(N−1)) are averaged so that the representative value from center region A is a mean value. Further, since the four corner regions B, D, F, and H of the M×N array have only a single imaging cell, the representative value for each corner region B, D, F, and H is the electrical value of the corner cell BI, DI, FI, and HI, respectively. In addition, the electrical values of the imaging cells in the four external regions C, E, G, and I are averaged so that the representative value from each external region C, E, G, and I is a mean value.

Further, since the diagonal regions J, K, L, M, N, O, P, and Q have only a single imaging cell, the representative value for each diagonal region J, K, L, M, N, O, P, and Q is the electrical value of the diagonal cell JI, KI, LI, MI, NI, OI, PI, and QI, respectively. In addition, the representative values of the imaging cells in each region R, S, T, U, V, W, X, and Y are averaged so that the representative value from each region R, S, T, U, V, W, X, and Y is a mean value.

Following this, method 500 moves from step 512 to step 514 to assign the representative value that was determined for each region in the M×N array to a corresponding matrix cell in the E×F matrix, and the representative values from the imaging cells in the H×I array that lie outside of the M×N array to corresponding matrix cells in the A×C matrix that lie outside of the E×F matrix.

FIGS. 4 and 6 illustrate the assigning step in accordance with the present invention. As shown in FIGS. 4 and 6, the representative value of center region A of M×N array 402 is put in center matrix cell A of E×F matrix 602. In addition, the representative values of the four corner regions B, D, F, and H of M×N array 402 are put into the corresponding corner matrix cells B, D, F, and H, respectively, of E×F matrix 602.

Further, the representative values of the four intermediate regions C, E, G, and I are put into the intermediate matrix cells C, E, G, and I, respectively. In other words, the (N−1) cells in the first and last rows of M×N array 402 are averaged and the values are put into the (1,2) and (3,2) elements of the 3×3 matrix 602. The (M−1) cells in the first and last columns of M×N array 402 are averaged and the values are put into the (2,1) and (2,3) elements of the 3×3 matrix 602.

As additionally shown in FIGS. 4 and 6, the representative values of the diagonal regions J, K, L, M, N, O, P, and Q are put into the corresponding diagonal matrix cells J, K, L, M, N, O, P, and Q respectively, of A×C matrix 600. Further, the representative values of the regions R, S, T, U, V, W, X, and Y are put into the matrix cells R, S, T, U, V, W, X, and Y, respectively.

Following the assignment step, method 500 moves from step 514 to step 516 to determine a number of directional cross talk coefficients from the representative values. The directional cross talk coefficients represent the percentage of the photogenerated electrons that are lost due to cross talk.

Figure 7:
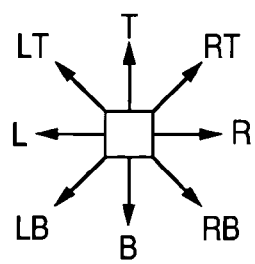
FIG. 7 is a diagram illustrating an example of a number of directional cross talk coefficients in accordance with the present invention.

FIG. 7 shows a diagram that illustrates an example of a number of directional cross talk coefficients in accordance with the present invention. As shown in FIG. 7, method 500 can utilize eight directional cross talk coefficients which can be represented by the scalar value of eight equally spaced vectors that lie in the same plane and have a common origin. The eight coefficients can include left L, right R, top T, bottom B, top left LT, bottom left LB, top right RT, and bottom right RB.

From FIG. 6, four of the cross talk coefficients can be calculated as follows:

$$LT = \frac{A_{LT} + A_{LT2}}{AA}, \quad (1)$$

$$RT = \frac{B_{RT} + B_{RT2}}{AA}, \quad (2)$$

$$LB = \frac{C_{LB} + C_{LB2}}{AA}, \quad (3)$$

$$RB = \frac{D_{RB} + D_{RB2}}{AA}, \quad (4)$$

where $A_{LT}$ and $A_{LT2}$ are the electrical values put into matrix cells J and K, respectively, $B_{RT}$ and $B_{RT2}$ are the electrical values put into matrix cells L and M, respectively, $C_{LB}$ and $C_{BL2}$ are the electrical values put into matrix cells P and Q, respectively, $D_{RB}$ and $D_{RB2}$ are the electrical values put into matrix cells N and O, respectively, and AA represents the representative value of region A put into center matrix cell A.

The representative value AA of region A is the true value of the imaging cells because the cross talk among the imaging cells is cancelled out. Therefore, the representative value AA of region A represents the electrical value of an imaging cell that has no cross talk. The representative value AA of region A is used as a reference in the extraction of cross talk coefficients. Depending on dopant profile, electrical cross talk distance varies. Here two pixels distance (generally it is more than 6 um) is taken into consideration.

The representative value BB of region B is equal to the value AA of region A except for a percentage of photogenerated electrons that are lost to the left (AA*L), to the top left (AA*LT), to the bottom left (AA*LB), to the top (AA*T), and to the top right (AA*RT), as shown in equation EQ. 5:

$$BB=AA-AA \cdot L-AA \cdot LT-AA \cdot LB-AA \cdot T-AA \cdot RT \quad (5).$$

The representative value CC of region C is equal to the value M of region A except for a percentage of photogenerated electrons that are lost to the top left (AA*LT), to the top (AA*T), and to the top right (AA*RT), as shown in equation EQ. 6:

$$CC=AA-AA \cdot LT-AA \cdot T-AA \cdot RT \quad (6).$$

The representative value III of region I is equal to the value M of region A except for a percentage of photogenerated electrons that are lost to the left (AA*L), to the top left (AA*LT), and to the bottom left (AA*LB), as shown in equation EQ. 7:

$$III=AA-AA \cdot L \cdot AA \cdot LT-AA \cdot LB \quad (7).$$

As a result, the representative values CC and III of regions C and I, respectively, can be rewritten as:

$$CC-BB=AA \cdot (L+LB) \quad (8),$$

$$III-BB=AA \cdot (T+RT) \quad (9).$$

Directional cross talk coefficients T and L can be obtained from:

$$T = \frac{III - BB}{AA} - RT, \quad (10)$$

$$L = \frac{CC - BB}{AA} - LB. \quad (11)$$

Similarly, the representative value FF of region F is equal to the value M of region A except for a percentage of photogenerated electrons that are lost to the right (AA*R), to the top right (AA*RT), to the bottom right (AA*RB), to the bottom (AA*B), and to the bottom left (AA*LB), as shown in equation EQ. 12:

$$FF=AA-AA \cdot R-AA \cdot RT-AA \cdot RB-AA \cdot B-AA \cdot LB \quad (12).$$

The representative value GG of region G is equal to the value M of region A except for a percentage of photogenerated electrons that are lost to the bottom (AA*B), to the bottom right (AA*RB), and to the bottom left (AA*LB), as shown in equation EQ. 13:

$$GG = AA - AA \cdot B - AA \cdot RB - AA \cdot LB \quad (13).$$

The representative value EE of region E is equal to the value AA of region A except for a percentage of photogenerated electrons that are lost to the top right (AA*RT), to the right (AA*R), and to the bottom right (AA*RB), as shown in equation EQ. 14:

$$EE = AA - AA \cdot RT - AA \cdot R - AA \cdot RB \quad (14).$$

Directional cross talk coefficients R and B can be obtained from:

$$R = \frac{GG - FF}{AA} - RT, \quad (15)$$

$$B = \frac{EE - FF}{AA} - LB. \quad (16)$$

Thus, equations EQ. 1-16 can be used to extract the eight directional cross talk coefficients LT, T, RT, R, RB, B, LB, and L from the acquired data. As noted above, these coefficients represent the percentage of photogenerated electrons that diffuse away from an exposed pixel. These cross talk electrons can travel more than one pixel distance under certain dopant profile and pixel pitch conditions.

The cross talk coefficients to the first neighbor pixels (J, L, N, and P; and R, T, V, and X) are calculated as following:

$$LT_1 = LT \cdot \frac{A_{LT}}{A_{LT} + A_{LT2}}, \quad (17)$$

$$RT_1 = RT \cdot \frac{B_{RT}}{B_{RT} + B_{RT2}}, \quad (18)$$

$$LB_1 = LB \cdot \frac{C_{LB}}{C_{LB} + C_{LB2}}, \quad (19)$$

$$RB - 1 = RB \cdot \frac{D_{RB}}{D_{RB} + D_{RB2}}, \quad (20)$$

$$T_1 = T \cdot \frac{F_T - AA \cdot (LT_1 + RT_1)}{F_T - AA \cdot (LT_1 + RT_1) + F_{T2}}, \quad (21)$$

$$R_1 = R \cdot \frac{G_R - AA \cdot (RB_{1'} + RT_1)}{G_R - AA \cdot (RB_1 + RT_1) + G_{R2}}, \quad (22)$$

$$B_1 = B \cdot \frac{H_B - AA \cdot (RB_1 + LB_1)}{H_B - AA \cdot (RB_1 + LB_1) + H_{B2}}, \quad (23)$$

$$L_1 = L \cdot \frac{E_L - AA \cdot (LB_1 + LT_1)}{E_L - AA \cdot (LB_1 + LT_1) + E_{L2}}, \quad (24)$$

where $F_T$ and $F_{T2}$ are the electrical values put into matrix cells R and S, respectively, $G_R$ and $G_{R2}$ are the electrical values put into matrix cells T and U, respectively, $H_B$ and $H_{B2}$ are the electrical values put into matrix cells V and W, respectively, $E_L$ and $E_{L2}$ are the electrical values put into matrix cells X and Y, respectively.

Due to the symmetry of pixel layout, the left and right cross talk coefficients L and R are equal, and the top and bottom cross talk coefficients T and B are equal. They are named as horizontal (H) and vertical (V) cross talk coefficients, respectively. The first neighbor pixel cross talk coefficients of horizontal and vertical directions are represented in equation (25) and equation (26) as:

$$H_1 = \frac{L_1 + R_1}{2}, \quad (25)$$

$$V_1 = \frac{T_1 + B_1}{2}. \quad (26)$$

The cross talk coefficients to the second neighbor pixels can be similarly calculated. In addition, for different wavelengths of light, the cross talk coefficients are different. The values of cross talk coefficients of longer wavelengths are larger than those of shorter wavelengths. The values in the above equations are all a function of wavelength ($\lambda$).

Figures 8, 9:
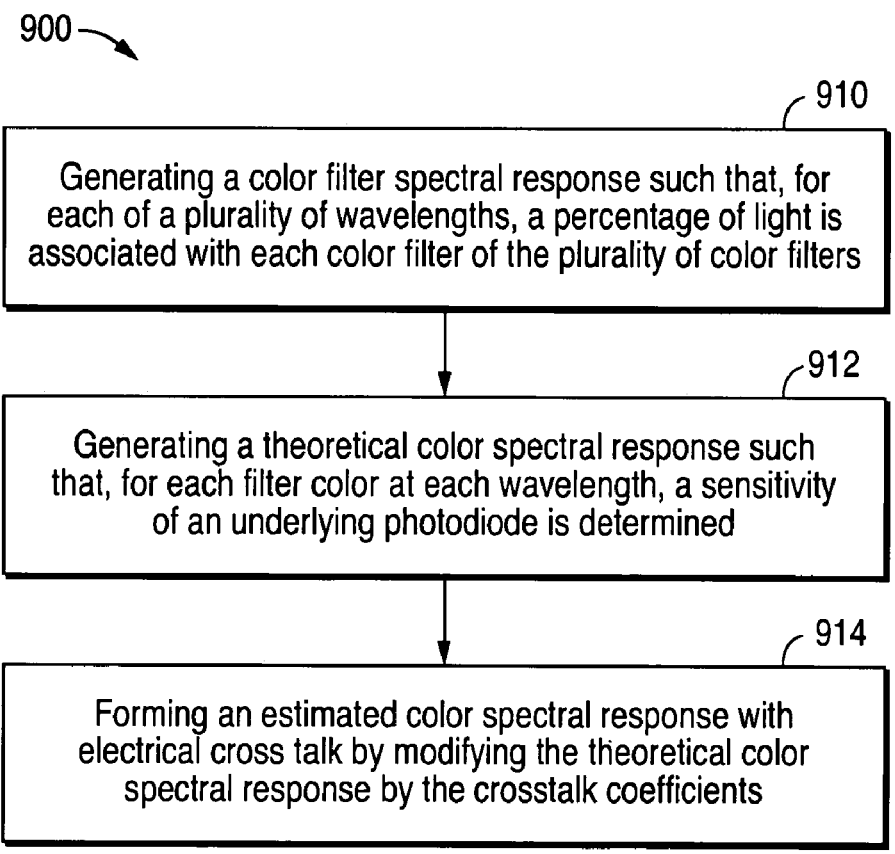
FIG. 8 is a diagram illustrating a prior-art Bayer pattern 800.
FIG. 9 is a flow chart illustrating an example of a method 900 of generating an estimated color spectral response in accordance with the present invention.

The Bayer pattern is the most commonly used color filter pattern in solid-state image sensors. FIG. 8 shows a diagram that illustrates a prior-art Bayer pattern 800. As shown in FIG. 8, Bayer pattern 800 provides a red (R), green (G) and blue (B) pattern. The second neighbor pixels in each of the eight directions are the same color pixels.

As further shown in FIG. 8, the cross talk to the second neighbor pixels in a Bayer pattern cancels out (regardless or direction, every other pixel from a pixel is the same color). The cancellation at edges of a scene may not be complete, but it only causes a little effect to the edges. The third neighbor pixel cross talk can also be ignored due to the limited electron traveling distance under a certain dopant profile condition. Therefore, only the cross talk of the first neighbor pixels (J, L, N, and P; and R, T, V, and X) needs to be taken into consideration in estimating the cross talk of a color solid-state image sensor. The cross talk coefficients can be quantified using the equations EQ. 17-26.

Further, to suppress the fixed pattern noise effect, the present process can be repeated many times with the opening in the layer of metal shielding placed over different imaging cells. Similar data acquisition and cross talk coefficient extraction processes are repeated for each position of the opening. The average of the cross talk coefficients is then the final result.

Referring again to FIG. 1, after step 112, method 100 moves to step 114 to generate an estimated color spectral response in response to a color filter spectral response, a monochrome (black and white) spectral response, and the crosstalk coefficients.

FIG. 9 shows a flow chart that illustrates an example of a method 900 of generating an estimated color spectral response in accordance with the present invention. As shown in FIG. 9, method 900 begins at step 910 by generating a color filter spectral response such that, for each of a plurality of wavelengths, a percentage of light is associated with each color filter of the plurality of color filters.

Figure 10:
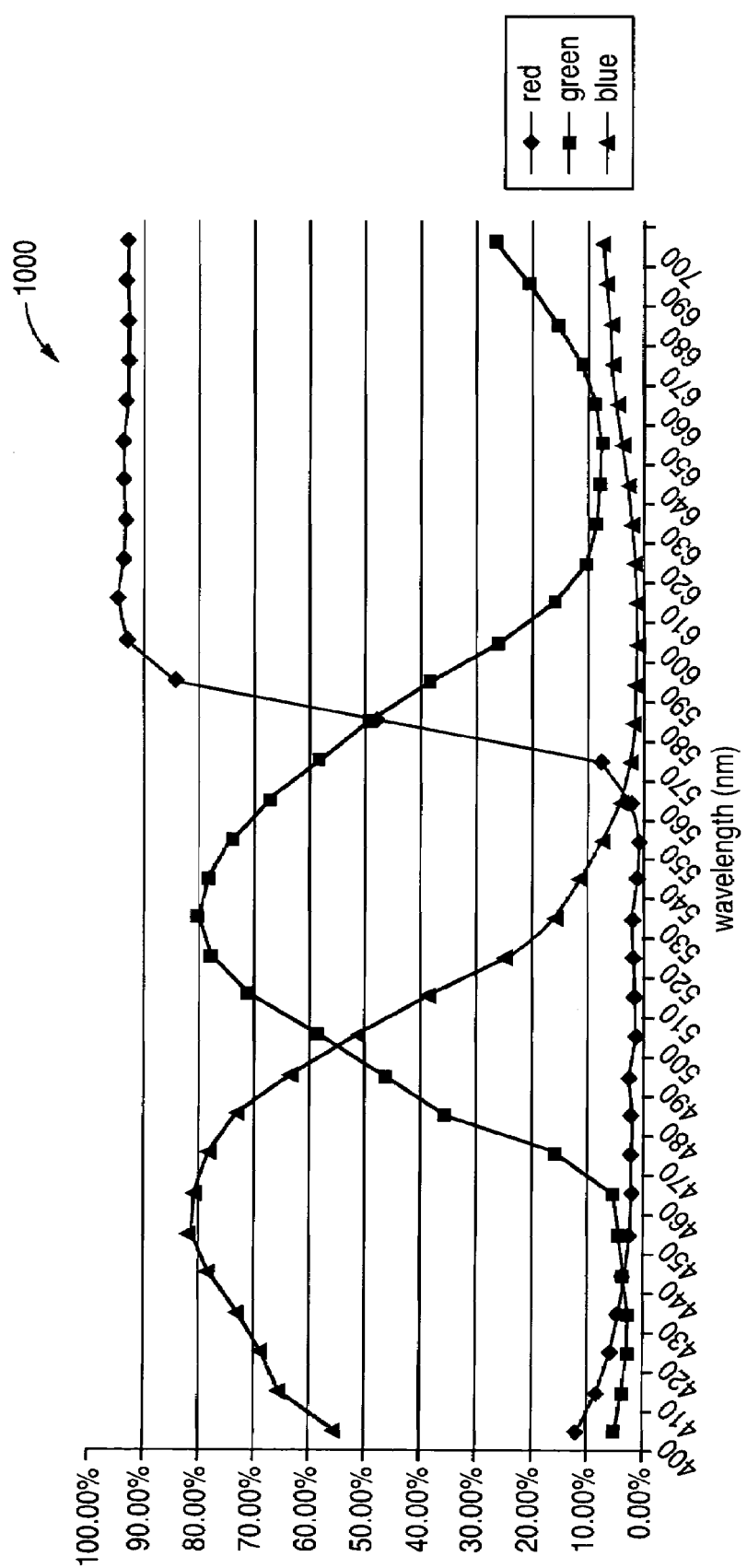
FIG. 10 is a graph illustrating an example of a color filter spectral response 1000 in accordance with the present invention.

FIG. 10 shows a graph that illustrates an example of a color filter spectral response 1000 in accordance with the present invention. Color filter spectral response 1000 indicates the percentage of light that passes through the red, green, and blue filters (which are formed over the imaging cells) when a wavelength of light strikes the filters.

For example, when light with a wavelength of 400 nm strikes the red, green, and blue filters, 12%, 5%, and 55% of the light passes through the red, green, and blue filters, respectively. Thus, even though no red light is present at 400 nm, 12% of the light still passes through the red filter and is collected as red light.

Once the color filter spectral response has been formed, method 900 moves from step 910 to step 912 to generate a theoretical color spectral response such that, for each filter color at each wavelength, a sensitivity of an underlying photodiode is determined. For example, due to the non-ideal color filter response, the sensitivities of the photodiodes underlying the red and green filters are not zero at 400 nm.

A theoretical color spectral response is calculated by multiplying a monochrome (black and white) spectral response (when no color filter is present) to the color filter spectral response. The theoretical color spectral response indicates the sensitivities of the imaging cells that underlie the color filters, and has the unit V/(W/m2·s). It is related to the input exposure level (W/m2·s) and output voltage V.

Figure 11:
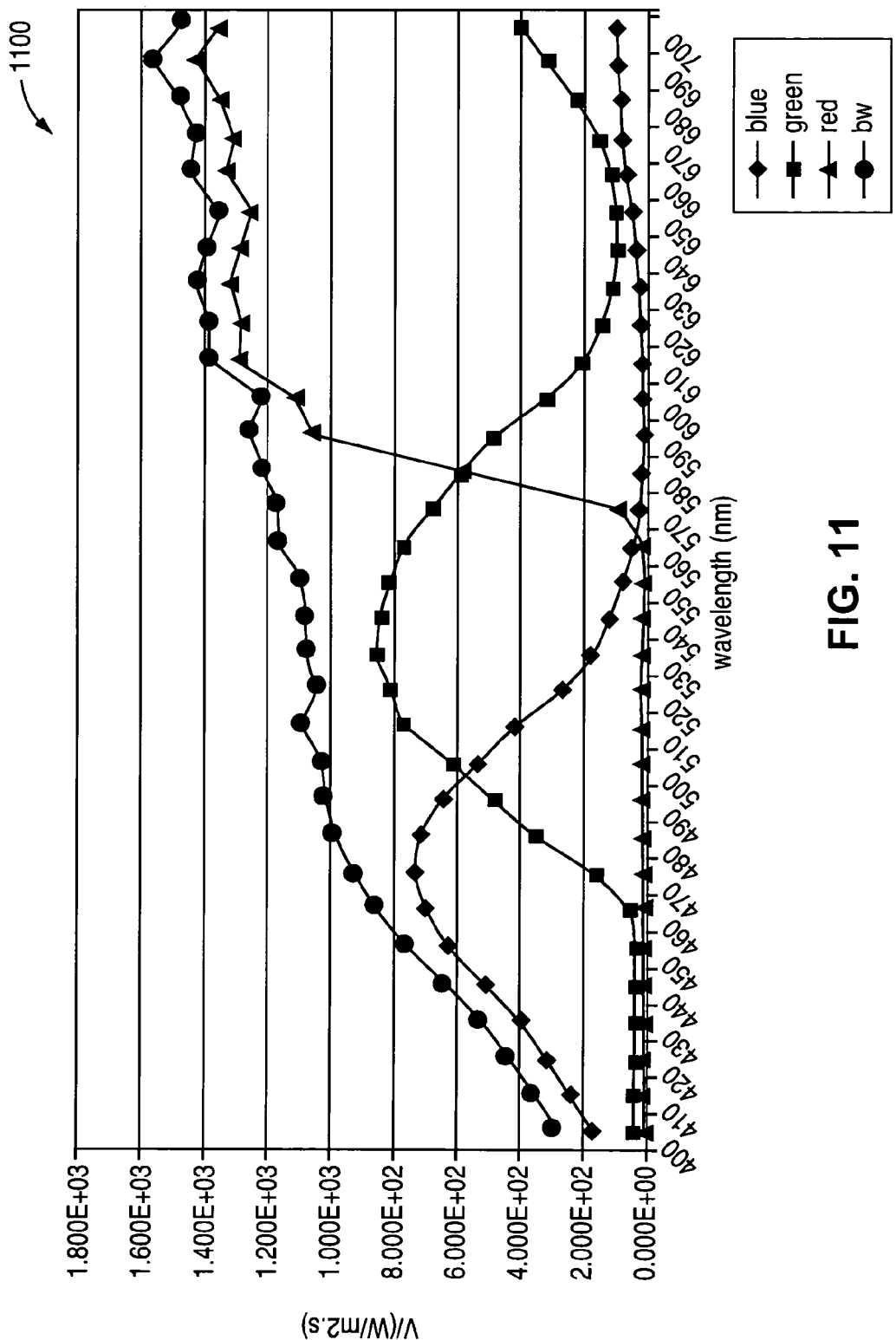
FIG. 11 is a graph illustrating an example of a theoretical color spectral response 1100 in accordance with the present invention.

FIG. 11 shows a graph that illustrates an example of a theoretical color spectral response 1100 in accordance with the present invention. As shown in FIG. 11, a monochrome spectral response BW indicates the sensitivities of the imaging cells with no filter over a range of wavelengths. In addition, the products of the color filter spectral responses (red, green, and blue) and the monochrome spectral response BW, which is the theoretical color spectral response, are shown.

For example, when the monochrome spectral response BW, which has a sensitivity of 300 V/(W/m2·s) at a wavelength of 400 nm, is multiplied times the color filter responses (of the red (12%), green (5%), and blue (55%) filters), a photodiode underlying a blue filter has a sensitivity of approximately 165 V/(W/m2·s) where (300*55%=165), a photodiode underlying a green filter has a sensitivity of approximately 15 V/(W/m2·s), and a photodiode underlying a red filter has a sensitivity of approximately 36 V/(W/m2·s).

Once the color filter spectral response has been formed, method 900 moves from step 912 to step 914 to form an estimated color spectral response with electrical cross talk by modifying the theoretical color spectral response by the crosstalk coefficients.

Starting with a theoretical color spectral response of a solid-state image sensor, such as is shown in FIG. 11, the estimated color spectral response with electrical cross talk can be estimated by applying the cross talk coefficients to the theoretical color spectral response based on the Bayer pattern shown in FIG. 8. The process is described by the following equations:

$$R(\lambda)=R_0(\lambda)+2\cdot[G_0(\lambda)-R_0(\lambda)]\cdot[H_1(\lambda)+V_1(\lambda)]+[LT_1(\lambda)+LB_1(\lambda)+RT_1(\lambda)+RB_1(\lambda)]\cdot[B_0(\lambda)-R_0(\lambda)] \quad (27),$$

$$G_B(\lambda)=G_0(\lambda)-2\cdot G_0(\lambda)\cdot[H_1(\lambda)+V_1(\lambda)]+2\cdot R_0(\lambda)\cdot V_1(\lambda)+2\cdot B_0(\lambda)\cdot H_1(\lambda) \quad (28),$$

$$G_R(\lambda)=G_0(\lambda)-2\cdot G_0(\lambda)\cdot[H_1(\lambda)+V_1(\lambda)]+2\cdot B_0(\lambda)\cdot V_1(\lambda)+2\cdot R_0(\lambda)\cdot H_1(\lambda) \quad (29),$$

$$B(\lambda)=B_0(\lambda)+2\cdot[G_0(\lambda)-B_0(\lambda)]\cdot[H_1(\lambda)+V_1(\lambda)]+[LT_1(\lambda)+LB_1(\lambda)-RT_1(\lambda)+RB_1(\lambda)]\cdot[R_0(\lambda)-B_0(\lambda)] \quad (30).$$

In the equations, $R_0$, $G_0$ and $B_0$ represent the red, green and blue pixel theoretical spectral response. R, $G_B$, $G_R$ and B represent the red, green and blue pixel spectral response with electrical cross talk. $G_B$ and $G_R$ represent the response of green pixel adjacent to blue or red in the same row respectively.

Figure 12:
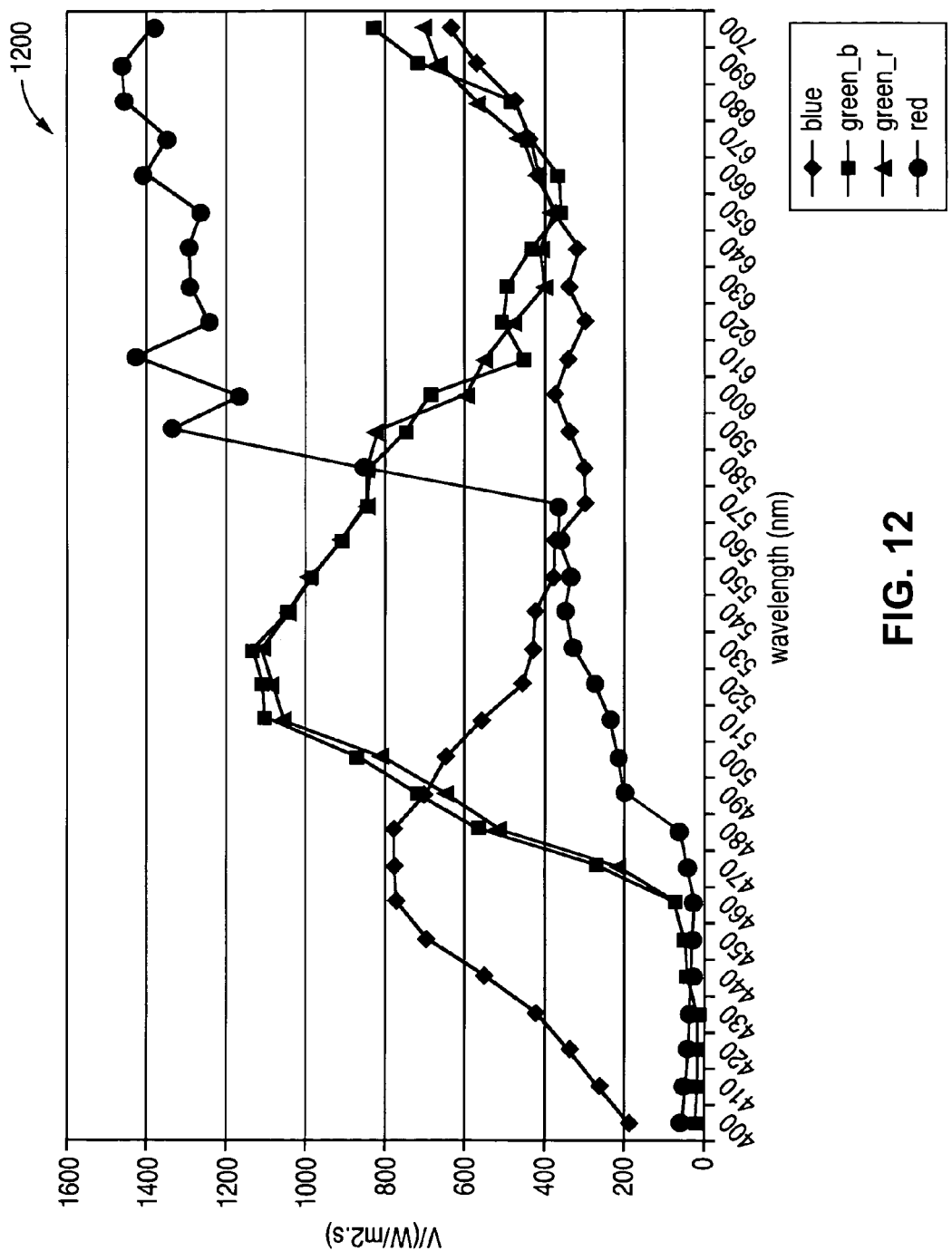
FIG. 12 is a graph illustrating an example of an estimated color spectral response 1200 in accordance with the present invention.

FIG. 12 shows a graph that illustrates an example of an estimated color spectral response 1200 in accordance with the present invention. Estimated color spectral response 1200 indicates the sensitivities of the photodiodes that underlie the red, green, and blue filters (which are formed over the imaging cells) over a range of wavelengths, as adjusted by the cross talk coefficients and micro lens effect. As shown in FIG. 12, the overlap area ratios of the different color responses increase due to the electrical crosstalk.

Figure 13:
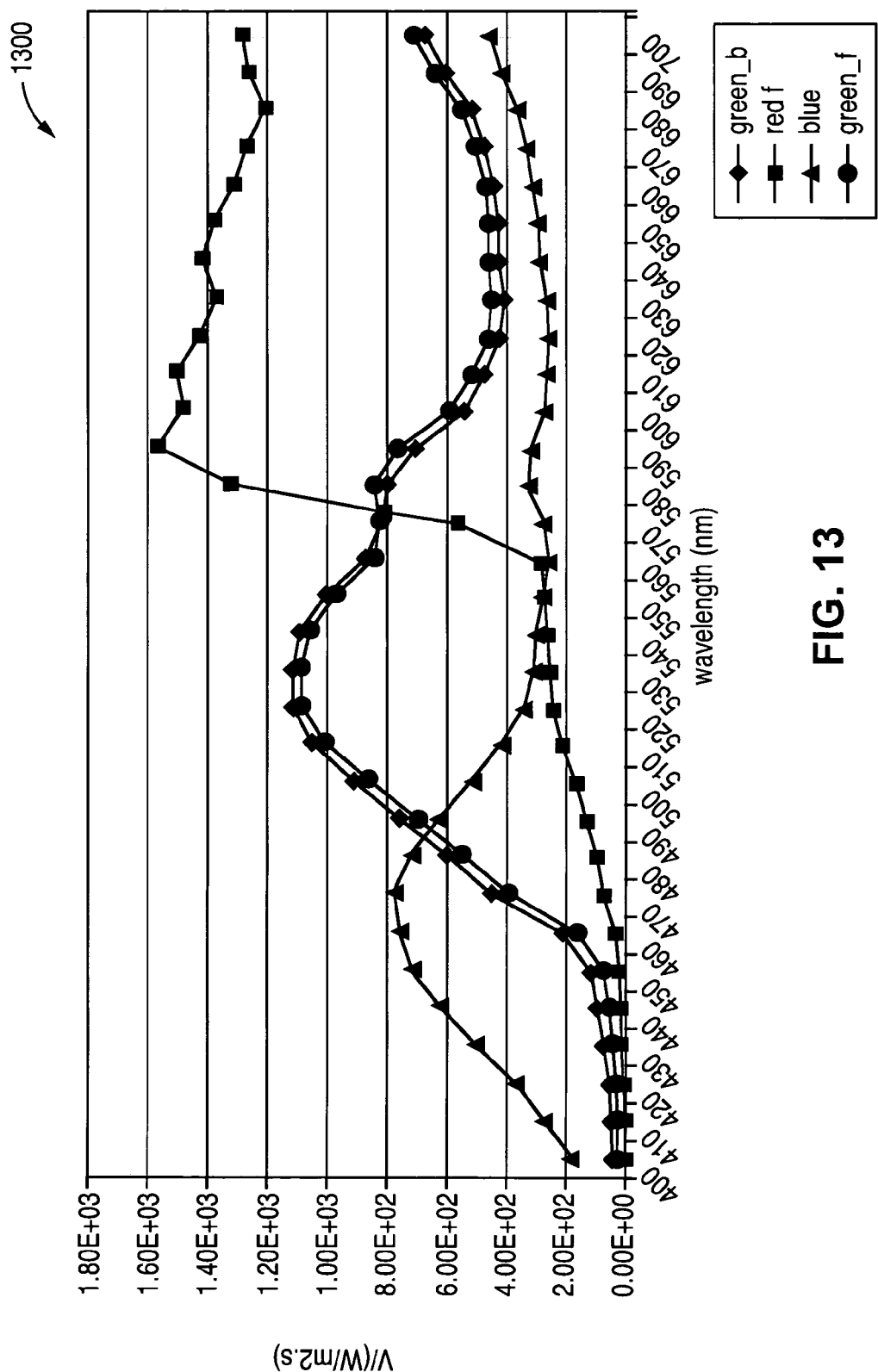
FIG. 13 is a graph illustrating an example of a measured color spectral response 1300 in accordance with the present invention.

FIG. 13 shows a graph that illustrates an example of a measured color spectral response 1300 in accordance with the present invention. As shown in FIGS. 12 and 13, experimental results show that the average difference between the estimated and measured color spectral responses 1200 and 1300 is approximately 5%.

Figure 14:
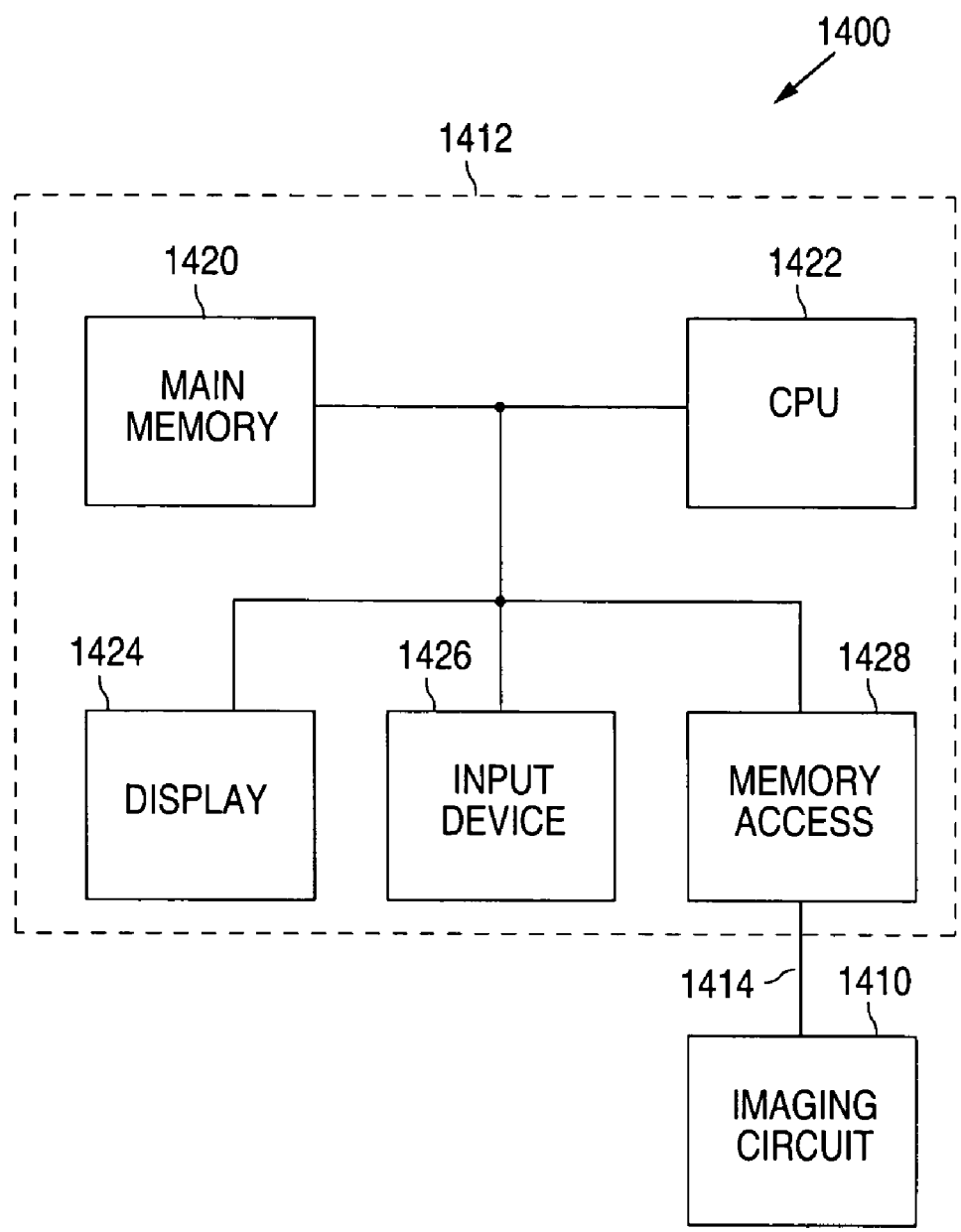
FIG. 14 is a block diagram illustrating an example of a test circuit 1400 in accordance with the present invention.

FIG. 14 shows a block diagram that illustrates an example of a test circuit 1400 in accordance with the present invention. As shown in FIG. 14, test circuit 1400 includes an imaging circuit 1410, a computer 1412, and a communication bus 1414 that electrically connects imaging circuit 1410 to computer 1412.

Imaging circuit 1410 can be implemented with an imager that includes a partially covered array of imaging cells, such as R×S array 310 and metal shielding layer 312 that partially covers R×S array 310 (shown in FIG. 3). In operation, imaging circuit 1410 outputs electrical information collected in accordance with method 200 from imaging cells in R×S array 310 to computer 1412 via communication bus 1414.

Computer 1412, which can be implemented with, for example, a Pentium4 3.2 GHz or comparable machine, includes a main memory 1420 that stores software and the electrical information collected by imaging circuit 1410. The software includes an operating system and a set of program instructions. The operating system can be implemented with, for example, the Linux operating system, although other operating systems can alternately be used. The program instructions, which implement methods of the present invention, can be written in, for example, C++ although other languages can alternately be used.

Further, computer 1412 includes a central processing unit (CPU) 1422 that is connected to memory 1420. CPU 1422, which can be implemented with, for example, a 32-bit processor, operates on the data in response to the program instructions. Although only one processor is described, the present invention can be implemented with multiple processors in parallel to increase the capacity to process large amounts of data.

In addition, computer 1412 includes a display system 1424 that is connected to CPU 1422, and a user-input system 1426, such as a keyboard and a mouse, which is connected to CPU 1422. Display system 1424 and input system 1426, which can be remotely located, allow a user to interact with the program.

Further, computer 1412 includes a memory access device 1428 which is connected to communication bus 1414, memory 1420 and CPU 1422. In addition, memory access device 1428 can be connected to an external medium, such as a disk drive or a networked computer, to allow the processed data from memory 1420 or CPU 1422 to be transferred to the external medium. In addition, device 1428 allows the program instructions to be transferred to memory 1420 from the external medium.

In operation, memory access device 1428 receives the electrical information from imaging circuit 1410, and stores the electrical information in memory 1420. CPU 1422 then executes software stored in memory 1420, using the electrical information collected by imaging circuit 1410 that is stored in memory 1420, to extract the cross talk coefficients in accordance with method 500 (as described in equations 16-26). (CPU 1422 can also be used to generate an estimated color spectral response in accordance with method 900.)

Thus, the present invention provides a method to estimate or characterize the electrical cross talk in a color solid-state image sensor. As noted above, there are three basic steps to characterize the electrical cross talk. The first step is to acquire cross talk data. The second step is to extract cross talk coefficients from the acquired data using equations EQ. 17-26. Lastly, the color spectral response with electrical cross talk can be estimated by applying the extracted coefficients to a theoretical no cross talk color spectral response.

One of the advantages of the present invention is that the present invention provides a simple and efficient way to estimate or characterize electrical cross talk in the industry such that the sources of cross talk and the amount of electrical cross talk in different directions can be quantified, thereby allowing color image sensor performance to be predicted from monochrome image sensor results. By predicting the performance, the design of the image sensor can be modified until the desired performance is achieved.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of estimating electrical crosstalk in an R×S array of imaging cells, the method comprising the steps of:
   acquiring electrical information from a plurality of cells in the R×S array of imaging cells to form a plurality of detected electrical values, wherein acquiring electrical information from the plurality of cells in the R×S array comprises the steps of:
   placing a light shielding cover over the R×S array of imaging cells, the cover exposing an M×N array of imaging cells, the M×N array being smaller than the R×S array;
   exposing the M×N array to uniform light energy from a light source;
   collecting light energy with the M×N array of imaging cells for an integration period; and
   detecting electrical values for imaging cells within the M×N array that represent an amount of light energy that was collected during the integration period, and electrical values for imaging cells within an H×I array of imaging cells that represent the amount of cross talk electrons that were collected during the integration period, the M×N array being centered within the H×I array, the H×I array being smaller than the R×S array;
   extracting a plurality of crosstalk coefficients from the detected electrical values; and
   generating an estimated color spectral response in response to a color filter spectral response, a monochrome spectral response, and the crosstalk coefficients.

2. The method of claim 1 wherein the extracting step further includes the steps of:
   forming an A×C matrix that has a plurality of matrix cells, the plurality of matrix cells including an E×F matrix;
   assigning electrical values from the H×I array to the matrix cells of the A×C matrix; and
   calculating a plurality of cross-talk coefficients from the A×C matrix.

3. The method of claim 2 wherein the E×F matrix includes a center cell, four corner cells, and a plurality of intermediate cells that lie between the four corner cells.

4. The method of claim 3 wherein the assigning step further includes the steps of:
   dividing the H×I array into a plurality of regions, each region having a corresponding matrix cell in the A×C matrix;
   determining a representative value for each region that represents the electrical values; and
   assigning the representative value from each region to a corresponding matrix cell in the A×C matrix.

5. The method of claim 4 wherein the plurality of regions of the H×I array include:
   a center region having an O×P array of imaging cells;
   four corner regions, each corner region having one imaging cell and contacting the center region; and
   four intermediate regions, each intermediate region extending from one corner region to another corner region, and contacting the center region.

6. The method of claim 5 wherein the assigning step further includes the steps of:
   assigning the representative value of the center region to the center cell of the A×C matrix;
   assigning the representative value of a corner region to a corner cell.

7. The method of claim 6 wherein the E×F matrix also includes a plurality of intermediate cells that lie between the four corner cells, and further comprising the step of assigning a representative value of an intermediate region to an intermediate cell.

8. The method of claim 6 wherein the representative value of the center region is a mean of the electrical values of the imaging cells in the center region.

9. The method of claim 2 wherein the E×F matrix is a 3×3 matrix.

10. The method of claim 2 wherein the plurality of crosstalk coefficients include eight crosstalk coefficients that are scalar values of a plurality of vectors, all of the vectors lying within a same plane, having a common origin, and being equally spaced apart.

11. The method of claim 1 wherein the generating the estimated color spectral response step further includes the steps of:

generating a color filter spectral response such that, for each of a plurality of wavelengths, a percentage of light is associated with each color filter of a plurality of color filters;

generating a theoretical color spectral response such that, for each filter color at each wavelength, a sensitivity of an underlying imaging cell is determined; and forming an estimated color spectral response with electrical cross talk by modifying the theoretical color spectral response by the crosstalk coefficients.

12. The method of claim 11 wherein the plurality of color filters include red, green, and blue color filters.

13. The method of claim 11 wherein the sensitivity changes over a range of wavelengths.

14. The method of claim 1 wherein the forming a plurality of crosstalk coefficients step is repeated a plurality of times to generate a plurality of coefficient groups that each include a plurality of crosstalk coefficients, the plurality of coefficients groups being averaged together to form an averaged plurality of crosstalk coefficients.

15. The method of claim 14 wherein each coefficient group results from an M×N array that includes different groups of imaging cells.

16. The method of claim 9 wherein the representative value of an intermediate region is a mean of the electrical values of the imaging cells in the intermediate region.

17. A test circuit comprising:

an imaging circuit having a first plurality of imaging cells and a light shield that covers imaging cells to expose a second plurality of imaging cells, the second plurality being less than the first plurality, the imaging circuit outputting electrical information on a third plurality of imaging cells following an integration period, the third plurality being less than the first plurality and greater than the second plurality with the second plurality of imaging cells centered within the third plurality of imaging cells;

a communication bus connected to the imaging circuit; and a computer connected to the communication bus, the computer receiving the electrical information from the imaging circuit, storing the electrical information in a memory, and extracting a plurality of cross talk coefficients from the electrical information, the cross talk coefficients indicating a percentage of charge carriers that are lost due to cross talk during the integration period.

* * * * *

UNITED STATES PATENT AND TRADEMARK OFFICE
CERTIFICATE OF CORRECTION

PATENT NO. : 7,400,352 B1  Page 1 of 1
APPLICATION NO. : 10/854056
DATED : July 15, 2008
INVENTOR(S) : Qiang Luo It is certified that error appears in the above-identified patent and that said Letters Patent is hereby corrected as shown below:

Column 14, line 1   delete "claim 9" and insert --claim 7--.

Signed and Sealed this

Thirtieth Day of June, 2009

JOHN DOLL
*Acting Director of the United States Patent and Trademark Office*